(12) United States Patent
Huang et al.

(10) Patent No.: US 8,445,055 B2
(45) Date of Patent: May 21, 2013

(54) METHOD FOR THE FABRICATION OF COMPOSITE PALLADIUM AND PALLADIUM-ALLOY MEMBRANES

(75) Inventors: Yan Huang, Jiangsu (CN); Xiaojuan Hu, Jiangsu (CN); Weidong Chen, Jiangsu (CN)

(73) Assignee: Nanjing University of Technology, Jiangsu (CN)

( * ) Notice: Subject to any disclaimer, the term of this patent is extended or adjusted under 35 U.S.C. 154(b) by 252 days.

(21) Appl. No.: 13/119,720

(22) PCT Filed: Nov. 27, 2009

(86) PCT No.: PCT/CN2009/075184
§ 371 (c)(1),
(2), (4) Date: Mar. 17, 2011

(87) PCT Pub. No.: WO2010/096988
PCT Pub. Date: Sep. 2, 2010

(65) Prior Publication Data
US 2011/0177232 A1    Jul. 21, 2011

(30) Foreign Application Priority Data
Feb. 26, 2009   (CN) .......................... 2009 1 0025153

(51) Int. Cl.
*C23C 18/18* (2006.01)
*C23C 18/44* (2006.01)
*C23C 18/48* (2006.01)

(52) U.S. Cl.
USPC ........... 427/11; 427/304; 427/404; 427/443.1

(58) Field of Classification Search
USPC ........................................... 427/11
See application file for complete search history.

(56) References Cited

U.S. PATENT DOCUMENTS

| | | | |
|---|---|---|---|
| 6,649,559 B2 * | 11/2003 | Drost et al. | 502/182 |
| 2002/0020298 A1 | 2/2002 | Drost et al. | |
| 2003/0190486 A1 * | 10/2003 | Roa et al. | 428/469 |

FOREIGN PATENT DOCUMENTS

JP    63-211795    *  9/1988

OTHER PUBLICATIONS

IBM Technical Disclosure Bulletin, Mar. 1967, vol. 9, Issue 10, p. 1309 (2 pages).*
Derwent Abstract of Japan 77022810 B, Jun. 20, 1977 (one page).*
Internations Search Report for PCT/CN2009/075184 of Mar. 4, 2010 (four pages).*

* cited by examiner

*Primary Examiner* — Katherine A Bareford
(74) *Attorney, Agent, or Firm* — Global IP Services; Tianhua Gu

(57) ABSTRACT

The invention relates to a method for the fabrication of composite palladium or palladium alloy membranes. The surface of the porous ceramic substrate is modified with pencil to create a uniform and smooth layer, and the membrane is deposited via electroless plating. The advantages of the pencil modification are a reduction of the substrate surface roughness and a repair of substrate surface defects, which leads to a great improvement in the membrane uniformity and hydrogen permeation performances. This method is facile and economic, and it is especially effective on low-cost macroporous ceramic substrate materials. Furthermore, this method generates almost no pollution and therefore is environmentally benign.

8 Claims, 2 Drawing Sheets

METHOD FOR THE FABRICATION OF COMPOSITE PALLADIUM AND PALLADIUM-ALLOY MEMBRANES

CROSS REFERENCE TO RELATED PATENT APPLICATION

The present application is the US national stage of PCT/CN2009/075184 filed on Nov. 27, 2009, which claims the priority of the Chinese patent application No. 200910025153.0 filed on Feb. 26, 2009, which application is incorporated herein by reference.

BACKGROUND OF THE INVENTION

1. Field of Invention

The present invention relates to a surface modification of a porous ceramic substrate and the fabrication of hydrogen-permeable composite palladium or palladium alloy membranes.

2. Related Art

Palladium membranes (including palladium-alloy membranes) are highly and exclusively permeable to hydrogen, and they have been applied as hydrogen separators or purifiers. In addition, they are stable at high temperature, which enables extensive applications. The membrane thickness can be greatly decreased once it is supported on a porous substrate. Such a concept of the "composite membrane" not only saves the precious metal but also increases the hydrogen permeability, which is inversely proportional to the membrane thickness. The substrate materials are mainly porous ceramics and porous stainless steels, but the former are predominant because of their superior chemical stability and the availability on the market. Among the various techniques for palladium membrane fabrication, electroless plating is one of the best. Before plating, the substrate surface must be activated by seeding metal nuclei as catalysts [Y. Huang, X. Li, Y. Fan, N. Xu. Palladium-based composite membranes: Principle, preparation and characterization. Prog. Chem., 2006, 18(2-3): 230-238.]; [J. Yu, X. Hu, Y. Huang. Ceramic modification of the porous stainless-steel surface toward the supported palladium membranes for hydrogen separation. Prog. Chem., 2008, 20(7-8): 1208-1215.].

The cost of the composite palladium membranes is a difficult problem against their more extensive applications. In addition to precious palladium, the substrate materials are also expensive. Although various porous ceramics are available on the market, they are mainly used as filters for solid-liquid separation rather than as membrane substrates. As far as the solid-liquid filtration is concerned, several defects (such as cracks and holes) in the filter may not be a large problem because of the formation of filter-cake, whereas, when the filter is used as a palladium membrane substrate, these defects can eventually lead to poor membrane selectivity or even a membrane failure. It is well known that the surface pore size and roughness of the porous ceramics strongly influence the fabrication of the palladium membranes, and, more precisely, porous substrates with a smooth surface and small pore size help to achieve thin and defect-free palladium membranes. However, this kind of porous ceramic often has an asymmetric structure and is extremely expensive, leading to a high cost for the whole membrane. If ordinary porous ceramic substrates are employed instead, a surface modification pretreatment is necessary to improve the surface properties, and a routine operation is surface coating.

The common coating materials are Al2O3, ZrO2, SiO2, MgO, TiO2, etc., and the most popular coating technique is the sol-gel process, which comprises (i) the preparation of a sol, (ii) coating the substrate, (iii) drying to form a gel layer, and (iv) a heat treatment to decompose the gel layer and to form a thin porous ceramic layer [X. L. Zhang, G. X. Xiong, W. S. Yang. A modified electroless plating technique for thin dense palladium composite membranes with enhanced stability. J. Membr. Sci., 2008, 314: 226-237.]; [H. B. Zhao, K. Pflanz, J. H. Gu. Preparation of palladium composite membranes by modified electroless plating procedure. J. Membr. Sci., 1998, 142: 147-157.]. However, the sol-gel process may be complicated and expensive, and it suffers from problems such as cracking and peeling at the coating layer. Moreover, it may be unsuitable to apply directly on macroporous ceramics. Xu et al. [H. Xu, S. Hou, W. Li, K. Jiang, L. Yuan. Composite metal palladium membrane or alloy palladium membrane and preparation process thereof. CN. Pat., No. 200410021025.6, 2004] patented a modified sol-gel process, in which the resulting gel layer on the porous ceramic substrate is not decomposed until the palladium membrane is deposited via electroless plating. However, the gel layer is unstable and may be damaged during the electroless plating, when the substrate has to go through acidic and basic solutions (the acidic solution is for activation pretreatment, and the basic solution is the plating bath, which also contains chelating agents at high concentration). Moreover, the final decomposition of the gel during heat treatment may lead to a poor membrane adhesion.

SUMMARY OF THE INVENTION

To facilitate membrane fabrication, this invention provides a convenient process, pencil coating, for the surface modification of the porous ceramics substrates. According to this invention, the fabrication of a composite palladium membrane comprises the following two steps:

(i) Scraping the substrate surface with pencil lead in order to create a smooth surface layer and repair the surface defects. To eliminate the contaminants, the pencil lead is annealed in advance and/or the substrate is annealed after the pencil coating.

(ii) Deposition of palladium and other metal via electroless plating. In the case of the fabrication of palladium alloy membranes, a heat treatment is also necessary. Before electroless plating, the substrate must be activated.

Conventional pencil lead was found to be an excellent material for the surface modification of the porous ceramics. It is mainly composed of graphite and clay. Like graphite, clay, a natural porous aluminosilicate, has fine granularity and perfect dispersity. The larger the content of clay, the harder the pencil lead. In general, pencils can be graded as 12B, 11B, 10B, 9B, 8B, 7B, 6B, 5B, 4B, 3B, 2B, B, F, HB, H, 2H, 3H, 4H, 5H, 6H, 7H, 8H, 9H, 10H, 11H and 12H, among which those between 6B and 4H are preferred in this invention. For low cost, it is preferable to employ the commercially available pencils. The shape of the pencil lead is flexible. The loading of the pencil lead on the porous ceramics is 2-50 g/m$^2$ depending on the surface roughness and pore size of the porous ceramics. The average pore size of an applicable porous ceramic is in the range of 0.5-10 μm, but 2-5 μm is most preferable.

Hydrogen separation is the main use of the palladium membrane, and the normal working temperature is below 500° C. As described above, the pencil lead is a mixture of graphite and clay, both of which are chemically stable against the membrane fabrication and working environment. The clay in the pencil lead plays an important role in maintaining the physical strength and porosity of the layer on the porous ceramic surface. To prevent organic contamination, either the pencil lead or the modified porous ceramics should be annealed at a temperature of 300-800° C. for 0.5-10 h.

Because graphite is electrically conductive, the ceramic surface becomes conductive after pencil coating, and electroplating also seems to be a good choice for palladium plating. However, electroplating for palladium deposition is not included in the present invention because it was not as effective as electroless plating in terms of the quality of the palladium layer. The principle of electroless plating is based on the reduction of metal ions (with a reductive agent) and the control of the metal growth. To initiate the electroless plating uniformly and quickly throughout the substrate surface, the substrate must be activated. Although the electrically conductive graphite can catalyze the electroless plating, its catalytic activity is not sufficient. Therefore, an activation treatment (e.g., seeding nano-sized palladium nuclei) is still necessary before electroless plating.

In the present invention, there are no special specifications for the activation pretreatment or electroless plating. In practice, the activation pretreatment is commonly carried out by seeding a layer of palladium nuclei on the substrate surface, and, for this purpose, many methods have already been reported, among which the most popular one is a $SnCl_2/PdCl_2$ process. Our research group has also patented one based on $Pd(OH)_2$ colloid [Y. Huang, J. Fan, S. Shu, X. Hu. A process for activating non-metal substrate for chemical plating. CN. Pat., No. 200710022996.6, 2007]; [Y. Huang, J. Fan, J. Yu, X. Hu. Atomizing activating process for electroless plating on water-absorbing substrate surface. CN. Pat. No. 200710134022.7, 2007]. For the palladium plating, electroless plating is generally the best method. The typical plating bath is composed of $PdCl_2$ 2-6 g/L, $Na_2EDTA$ 40-80 g/L and $NH_3.H_2O$ 100-400 ml/L, and the reducing agent is a $N_2H_4$ solution. As for the fabrication of palladium alloy membranes, the deposition of other metal(s) should be performed after the deposition of palladium, followed by a heat treatment in a protective or inert atmosphere to form the alloy. Apart from the electroless plating, the deposition of other metal(s) can also be carried out by any other proper methods such as electroplating. Among various palladium alloy composite membranes, the Pd—Ag and Pd—Cu ones are the most popular, and the platings of Ag and Cu have been mainly done by electroless plating as well. The copper plating bath is often composed of $CuSO_4.5H_2O$ 5-15 g/L, NaOH 5-20 g/L, and $KNaC_4H_4O_6.4H_2O$ 40-50 g/L, and the reducing agent is a HCHO solution. The silver plating bath is often composed of $AgNO_3$ 2-10 g/L, $Na_2EDTA$ 30-50 g/L, and $NH_3.H_2O$ 300-600 ml/L, and the reducing agent is a $N_2H_4$ solution.

ADVANTAGES OF THE INVENTION

The present invention provides a facile method for the surface modification of porous ceramic substrates toward the fabrication of palladium and palladium alloy membranes, and this method is effective even for low-cost macroporous substrate materials. Moreover, it is a green process and thoroughly avoids the pollution that is created in the sol-gel process. The resulting membranes show improved uniformity, lustrousness and adhesion.

BRIEF DESCRIPTION OF THE DRAWINGS

For a better understanding of the present invention, reference is made to Embodiment 1, in which.

DESCRIPTION OF THE EMBODIMENTS

Embodiment 1

Figure 1:
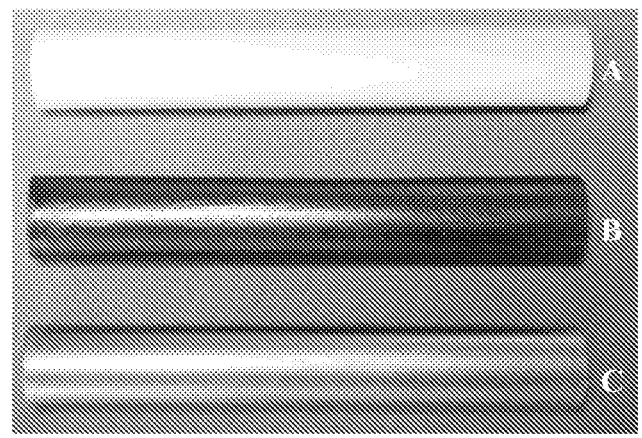
FIG. 1 is a photo where (A) denotes the fresh porous ceramic substrate, (B) the substrate after modification with pencil, and (C) the resulting palladium membrane.
Figure 2:
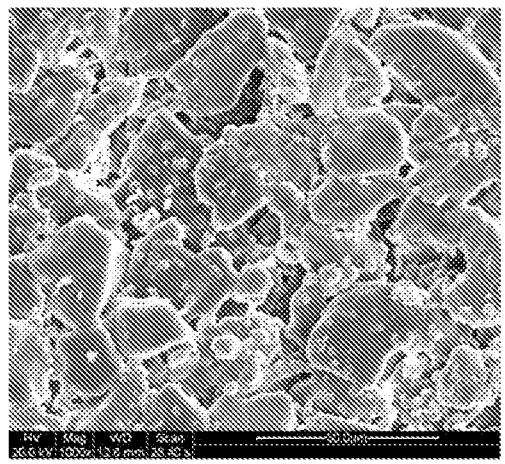
FIG. 2 is an SEM micrograph of the porous ceramic substrate.

(1) A porous $Al_2O_3$ tube (o.d., 12 mm; i.d., 8 mm; length, 83 mm) was employed as the substrate material. It is displayed in FIG. 1(A), and the SEM micrograph of its surface is shown in FIG. 2. As measured by the bubble-point method, the mean and the largest pore sizes of this substrate were 3 and 9 μm, respectively.

Figure 3:
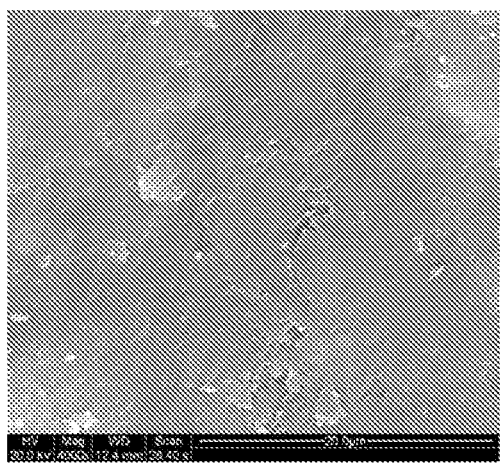
FIG. 3 is an SEM micrograph of the substrate surface after modification with pencil.

(2) A pencil lead that was obtained from a conventional 2B pencil was calcined at 600° C. for 4 h. The shell side surface of the substrate was modified by scraping with the pencil lead. During this operation, the ceramic tube was brushed with a paper towel from time to time to remove the excessive pencil lead powder. Finally, the whole ceramic tube looked uniformly black and lustrous, and it is demonstrated in FIG. 1(B). The SEM micrograph of its surface is shown in FIG. 3. The loading of the pencil lead powder on the substrate surface was about 5 g/m$^2$.

(3) The modified substrate was rinsed with water, then soaked with a hot solution of a conventional detergent and finally cleaned with water.

(4) The substrate was activated using the conventional $SnCl_2/PdCl_2$ method, i.e., it was alternately immersed in a $SnCl_2$ solution ($SnCl_2.2H_2O$, 5 g/L; 37% HCl, 1 ml/L) and in a $PdCl_2$ solution ($PdCl_2$, 0.2 g/L; 37% HCl, 1 ml/L), and each immersion was followed by a rinse with water. The $SnCl_2/PdCl_2$ treatment was repeated 4 times, followed by cleaning with water.

(5) Electroless plating of palladium. The plating bath was composed of $PdCl_2$ 5 g/L, 28% $NH_3.H_2O$ 250 ml/L and $Na_2EDTA$ 70 g/L. The reducing agent was a 0.2 mol/L $N_2H_4$ solution. After plating, the resulting palladium membrane was thoroughly cleaned with water, then soaked in anhydrous ethanol for 0.5 h and finally dried at 120° C. overnight.

Figure 4:
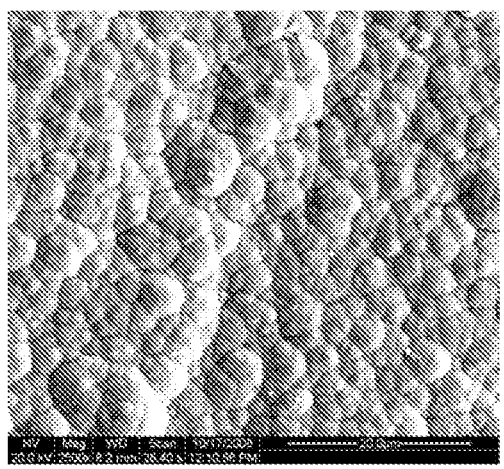
FIG. 4 is an SEM micrograph of the surface of the palladium membrane.

(6) The average membrane thickness that was calculated according to the weight gain was about 5.0 μm. As indicated in FIG. 1(C), the membrane surface was uniform, lustrous and continuous. Its SEM micrograph is shown in FIG. 4. According to the permeation test with $H_2/N_2$ single gas mode, the hydrogen flux under a pressure of 1 bar was 22.5 m$^3$/(m$^2$h) at 400° C., and the corresponding $H_2/N_2$ selectivity was above 200. For reference, palladium membranes that were prepared under the same conditions except for the pencil modification were not successful, e.g., their $H_2/N_2$ selectivity measured under the same testing conditions was even below 5.

Embodiment 2

(1) This step was the same as Step (1) in Embodiment 1, except that the average pore size of the porous ceramic substrate was 1 μm.

(2) The whole substrate surface was scraped with a conventional 2H pencil until a uniform layer of pencil lead was coated, and the loading of the pencil lead powder was about 10 g/m$^2$. The substrate was calcined for 5 h at 500° C.

(3) The same as Steps (4) and (5) in Embodiment 1.

(4) The same as Step (6) in Embodiment 1, except that the thickness of the palladium membrane was 5.5 μm.

Embodiment 3

The same as Steps (1), (2), (3), (4) and (5) in Embodiment 1, except that the average pore size of the substrate was 0.5 μm. The thickness of the prepared palladium membrane was 4.5 μm.

Embodiment 4

(1) The same as Steps (1), (2), (3), (4) and (5) in Embodiment 1, except that the thickness of the resulting palladium layer was 2.2 μm.

(2) To fabricate the Pd—Cu alloy membrane, a layer of copper was deposited on the palladium layer, followed by a heat treatment in hydrogen. The copper plating bath was composed of $CuSO_4.5H_2O$ 10 g/L, NaOH 10 g/L and $KNaC_4H_4O_6.4H_2O$ 45 g/L. The reducing agent was a 0.2 mol/L formaldehyde solution. The thickness of the copper layer calculated according to the weight gain was 2.0 μm.

Embodiment 5

(1) The same as Steps (1), (2), (3), (4), and (5) in Embodiment 1, except that the thickness of the prepared palladium membrane was 3.0 μm.

(2) To fabricate the Pd—Ag alloy membrane, a layer of silver was deposited on the palladium layer, followed by a heat treatment in hydrogen. The silver plating bath was composed of $AgNO_3$ 5 g/L, $Na_2EDTA$ 35 g/L and 28% $NH_3.H_2O$ 500 ml/L. The reducing agent was 0.2 mol/L of hydrazine solution. The thickness of the silver layer was 3.5 μm.

It should be understood that the above embodiments are merely exemplary and that variations can be made by those having ordinary skills in the art without departing from the scope of the invention. All such variations, modifications and alternate embodiments are intended to be included within the scope of the present invention.

What is claimed is:

1. A method for fabricating composite palladium or palladium alloy membranes, comprising:
    a) a surface of a porous ceramic substrate is coated using a pencil with a smear layer of pencil lead from the pencil so that surface roughness of the substrate is reduced and surface defects of the substrate are repaired, wherein for avoiding contamination, the pencil lead is annealed before smearing and the substrate coated with pencil lead is annealed before an electroless plating, then
    b) activate the smear layer of pencil lead, and thereafter the membrane is deposited via electroless plating.

2. The method according to claim 1, wherein in the step a), the annealing temperature of the annealing of the substrate is 300-800° C., and annealing time for the annealing of the substrate is 0.5-10 h.

3. The method according to claim 1, wherein an average pore size of the porous ceramic substrate is 0.5-10 μm.

4. The method according to claim 1, wherein a hardness of the pencil lead is between 12B-12H.

5. The method according to claim 1, wherein a density of the smear layer of pencil lead on the substrate is 2-50 g/m$^2$.

6. The method according to claim 1, wherein the palladium membrane is deposited on the substrate by electroless plating in a plating bath containing $PdCl_2$ 2-6 g/L, $Na_2EDTA$ 40-80 g/L, and $NH_3.H_2O$ 100-400 ml/L, and with a reducing agent that is a hydrazine solution.

7. The method according to claim 1, wherein the palladium alloy membrane is deposited on the substrate by successively electrolessly plating palladium, then electrolessly plating other metal, and a heat treatment is followed thereafter to make the plated palladium and other metal form palladium alloy.

8. The method according to claim 1, wherein the membrane is palladium alloy, and the palladium alloy is palladium-silver or palladium-copper alloy.

* * * * *